US012057997B1

(12) United States Patent
Seletskiy et al.

(10) Patent No.: US 12,057,997 B1
(45) Date of Patent: Aug. 6, 2024

(54) SYSTEMS AND METHODS FOR AUTOMATED CONVERSION AND MANAGEMENT OF WEB SERVER CONFIGURATION FILES

(71) Applicant: Cloud Linux Software Inc., Estero, FL (US)

(72) Inventors: Igor Seletskiy, Palo Alto, CA (US); Danila Vershinin, Zasechnoye (RU)

(73) Assignee: Cloud Linux Software, Inc., Estero, FL (US)

( * ) Notice: Subject to any disclaimer, the term of this patent is extended or adjusted under 35 U.S.C. 154(b) by 0 days.

(21) Appl. No.: 18/479,849

(22) Filed: Oct. 3, 2023

(51) Int. Cl.
| G06F 15/16 | (2006.01) |
| G06F 9/445 | (2018.01) |
| G06F 16/11 | (2019.01) |
| H04L 41/0803 | (2022.01) |

(52) U.S. Cl.
CPC ...... *H04L 41/0803* (2013.01); *G06F 9/44505* (2013.01); *G06F 16/116* (2019.01)

(58) Field of Classification Search
CPC . H04L 41/0803; G06F 16/116; G06F 9/44505
See application file for complete search history.

(56) References Cited

U.S. PATENT DOCUMENTS

| 2004/0015890 A1* | 1/2004 | Wong | G06F 16/116 |
| | | | 717/137 |
| 2017/0187750 A1* | 6/2017 | Zhang | H04L 63/20 |
| 2023/0035600 A1* | 2/2023 | Holzman | G06F 8/71 |
| 2023/0037199 A1* | 2/2023 | Holzman | H04L 41/0843 |
| 2023/0214231 A1* | 7/2023 | Yuan | G06F 8/447 |
| | | | 713/1 |

OTHER PUBLICATIONS

Seamlessly Switch from Apache to Nginx: The Ultimate Virtual Host Converter Guide; localhost; 2024; retrieved from https://locall.host/apache-virtual-host-to-nginx-converter/ on Jun. 7, 2024; pp. 1-22 (Year: 2024).*

(Continued)

*Primary Examiner* — Oleg Survillo
(74) *Attorney, Agent, or Firm* — ArentFox Schiff LLP; Michael Fainberg

(57) ABSTRACT

Disclosed herein are systems and methods for automated conversion and management of web server configuration files using a conversion application. In one aspect, an exemplary method comprises receiving an input configuration file for conversion from an Apache configuration file to an NGINX configuration file, parsing the input configuration file into tokens for processing to construct an Apache configuration tree in memory, building a structured Apache configuration tree from the tokens and storing in memory, traversing the Apache configuration tree examining each element of the Apache configuration tree, and for each Apache directive or block that is encountered during the examination, invoking a directive conversion plugin for handling requirements of the respective Apache directive or block, building an NGINX configuration tree corresponding to the Apache configuration tree, and writing the NGINX configuration depicted in the NGINX configuration tree to an NGINX configuration file.

21 Claims, 7 Drawing Sheets

(56) References Cited

OTHER PUBLICATIONS

Justin Ellingwood; How To Migrate from an Apache Web Server to Nginx on an Ubuntu VPS; DigitalOcean; Dec. 17, 2013; retrieved from https://www.digitalocean.com/community/tutorials/how-to-migrate-from-an-apache-web-server-to-nginx-on-an-ubuntu-vps on Jun. 7, 2024; pp. 1-25 (Year: 2013).*
Alex Garnett and Justin Ellingwood; Apache vs Nginx: Practical Considerations; DigitalOcean; Mar. 17, 2022; retrieved from https://www.digitalocean.com/community/tutorials/apache-vs-nginx-practical-considerations on Jun. 7, 2024; pp. 1-19 (Year: 2022).*
Htaccess to nginx converter; Winginx; 2023; retrieved from https://winginx.com/en/htaccess on Jun. 7, 2024; 1 page (Year: 2023).*
Winginx docs; 2023; 2 pages (Year: 2023).*

* cited by examiner

300

301
```
RewriteCond %{HTTPS} on [OR]
RewriteCond %{SERVER_PORT} ^443$ [OR]
RewriteCond %{HTTP:X-Forwarded-Proto} https
RewriteRule .* - [E=WPR_SSL:-https
```

302
```
RewriteRule .* - [E=HTTP_AUTHORIZATION:%{HTTP:Authorization}]
RewriteBase /
RewriteRule ^index\.php$ - [L]
RewriteCond %{REQUEST_FILENAME} !-f
RewriteCond %{REQUEST_FILENAME} !-d
RewriteRule . /index.php [L]
```

303
```
# Set WPR_ENC environment variable to "_gzip"
RewriteCond %{HTTP:Accept-Encoding} gzip
RewriteRule .* - [E=WPR_ENC:_gzip]
```

304
```
RewriteCond %{REQUEST_METHOD} GET
RewriteCond %{QUERY_STRING} =""
RewriteCond %{HTTP:Cookie} !(wordpress_logged_in_+|wp-postpass_|wptouch_switch_toggle|comment_author_|comment_author_email_) [NC]
RewriteCond %{REQUEST_URI} !^.*((?:.+/)?feed(?:/(?:.+/)?)?|(?:.+/)?embed|/(index\.php)?/?wp\-json(/.*|$))$ [NC]
RewriteCond %{HTTP:X-Wap-Profile} !^[a-z0-9\"]+ [NC]
RewriteCond %{HTTP:Profile} !^[a-z0-9\"]+ [NC]
RewriteCond %{HTTP_USER_AGENT} !^.*(2.0\ MMP|240x320|400X240|AvantGo|BlackBerry|Blazer|Cellphone|Danger|DoCoMo|Elaine/3.0|EudoraWeb|Googlebot-Mobile|hiptop|IEMobile|KYOCERA/WX310K|LG/U990|MIDP-2.|MMEF20|MOT-V|NetFront|Newt|Nintendo\ Wii|Nitro|Nokia|Opera\ Mini|Palm|PlayStation\ Portable|portalmmm|Proxinet|ProxiNet|SHARP-TQ-GX10|SHG-i900|Small|SonyEricsson|Symbian\ OS|SymbianOS|TS21i-10|UP.Browser|UP.Link|webOS|Windows\ CE|WinWAP|YahooSeeker/M1A1-R2D2|iPhone|iPod|Android|BlackBerry9530|LG-TU915\ Obigo|LGE\ VX|webOS|Nokia5800).* [NC]
RewriteCond %{HTTP_USER_AGENT} !^(w3c\ |w3c-|acs-|alavi|alca|amoi|audi|avan|benq|bird|blac|blaz|brew|cell|cldc|cmd-|dang|doco|eric|hipt|htc_|inno|ipaq|podj|jigs|kddi|keiji|leno|lg-c|lg-d|lg-g|lge-|lg-u|maui|maxo|midp|mits|mmef|mobi|mot-|moto|mwbp|nec-|newt|noki|palm|pana|pant|phil|play|port|prox|qwap|sage|sams|sany|sch-|sec-|send|seri|sgh-|shar|sie-|siem|smal|smar|sony|sph-|symb|t-mo|teli|tim-|tosh|tsm-|upg1|upsi|vk-v|voda|wap-|wapa|wapi|wapp|webc|winw|winw|xda\ |xda-).* [NC]
RewriteCond %{HTTP_USER_AGENT} !^(facebookexternalhit|WhatsApp).* [NC]
RewriteCond "%{DOCUMENT_ROOT}/vfs:-//public/wp-content/cache/wp-
```

```
map $https $localhost_rule_2_https {                                              401
    ~on 1;
}
map $server_port $localhost_rule_2_server_port {
    ~^443$ 1;
}
map $http_x_forwarded_proto $localhost_rule_2_http_x_forwarded_proto {
    ~https 1;
}
map
${localhost_rule_2_https}${localhost_rule_2_server_port}${localhost_rule_2_http_x_forwarded_proto}
$localhost_wpr_ssl {
    ~1 -https;
}
map localhost_rule_3_http_accept_encoding $localhost_wpr_enc {
    ~gzip _gzip;
}
map $request_method $localhost_rule_4_request_method {
    ~GET 1;
}
map $query_string $localhost_rule_4_query_string {
    "" 1;
}
map $http_cookie $localhost_rule_4_http_cookie {
    default 1;
    ~*(wordpress_logged_in_.+|wp-
postpass_|wptouch_switch_toggle|comment_author_|comment_author_email_) 0;
}
map $httpd_request_uri $localhost_rule_4_httpd_request_uri {
    default 1;
    ~*^(/(?:.+/)?feed(?:/(?:.+/?)?)?$|/(?:.+/)?embed/|/(index\.php/)?wp\-json(/.*|$))$ 0;
}
map $http_x_wap_profile $localhost_rule_4_http_x_wap_profile {
    default 1;
    ~*^[a-z0-9\"]+ 0;
}
map $http_profile $localhost_rule_4_http_profile {
    default 1;
    ~*^[a-z0-9\"]+ 0;
}
map $http_user_agent $localhost_rule_4_http_user_agent {
    default 1;
    ~*^.*(2.0\ MMP|240x320|400X240|AvantGo|BlackBerry|Blazer|Cellphone|Danger|DoCoMo|Elaine/
3.0|EudoraWeb|Googlebot-Mobile|hiptop||EMobile|KYOCERA/WX310K|LG/U990|MIDP-2.|MMEF20|MOT-
V|NetFront|Newt|Nintendo\ Wii|Nitro|Nokia|Opera\ Mini|Palm|PlayStation\
Portable|portalmmm|Proxinet|ProxiNet|SHARP-TQ-GX10|SHG-i900|Small|SonyEricsson|Symbian\
OS|SymbianOS|TS21i-10|UP.Browser|UP.Link|webOS|Windows\ CE|WinWAP|YahooSeeker|M1A1-
R2D2|iPhone|iPod|Android|BlackBerry9530|LG-TU915\ Obigo|LGE\ VX|webOS|Nokia5800).* 0;
    ~*^(w3c\ |w3c-|acs-|alav|alca|amoi|audi|avan|benq|bird|blac|blaz|brew|cell|cldc|cmd-
|dang|doco|eric|hipt|htc_|inno|ipaq|ipod|jigs|kddi|keji|leno|lg-c|lg-d|lg-g|lge-|lg/
u|maui|maxo|midp|mits|mmef|mobi|mot-|moto|mwbp|nec-
|newt|noki|palm|pana|pant|phil|play|port|prox|qwap|sage|sams|sany|sch-|sec-|send|seri|sgh-|shar|sie-
|siem|smal|smar|sony|sph-|symb|t-mo|teli|tim-|tosh|tsm-|upg1|upsi|vk-v|voda|wap-
|wapa|wapi|wapp|wapr|webc|winw|winw|xda\ |xda-).* 0;
    ~*^(facebookexternalhit|WhatsApp).* 0;
}
map
${localhost_rule_4_request_method}${localhost_rule_4_query_string}${localhost_rule_4_http_cookie}${loca
lhost_rule_4_httpd_request_uri}${localhost_rule_4_http_x_wap_profile}${localhost_rule_4_http_profile}${loc
alhost_rule_4_http_user_agent}${localhost_rule_4_http_user_agent}${localhost_rule_4_http_user_agent}
$localhost_try_files_uri {
    111111111 /vfs://public/wp-content/cache/wp-rocket/${http_host}${httpd_request_uri}/
index${localhost_wpr_ssl}None.html${localhost_wpr_enc};
}
...
try_files $localhost_try_files_uri $uri $uri/ /index.php$is_args$args;
```

```
<IfModule mod_expires.c>
    ExpiresActive on
    ExpiresDefault                          "access plus 1 month"
    # cache.appcache needs re-requests in FF 3.6 (thanks Remy ~Introducing HTML5)
    ExpiresByType text/cache-manifest       "access plus 0 seconds"
    # Your document html
    ExpiresByType text/html                 "access plus 0 seconds"
    # Data
    ExpiresByType text/xml                  "access plus 0 seconds"
    ExpiresByType application/xml           "access plus 0 seconds"
    ExpiresByType application/json          "access plus 0 seconds"
    # Feed
    ExpiresByType application/rss+xml       "access plus 1 hour"
    ExpiresByType application/atom+xml      "access plus 1 hour"
    # Favicon (cannot be renamed)
    ExpiresByType image/x-icon              "access plus 1 week"
    # Media: images, video, audio
    ExpiresByType image/gif                 "access plus 4 months"
    ExpiresByType image/png                 "access plus 4 months"
    ExpiresByType image/jpeg                "access plus 4 months"
    ExpiresByType image/webp                "access plus 4 months"
    ExpiresByType video/ogg                 "access plus 4 months"
    ExpiresByType audio/ogg                 "access plus 4 months"
    ExpiresByType video/mp4                 "access plus 4 months"
    ExpiresByType video/webm                "access plus 4 months"
    ExpiresByType image/avif                "access plus 4 months"
    ExpiresByType image/avif-sequence       "access plus 4 months"
    # HTC files (css3pie)
    ExpiresByType text/x-component          "access plus 1 month"
    # Webfonts
    ExpiresByType font/ttf                  "access plus 4 months"
    ExpiresByType font/otf                  "access plus 4 months"
    ExpiresByType font/woff                 "access plus 4 months"
    ExpiresByType font/woff2                "access plus 4 months"
    ExpiresByType image/svg+xml             "access plus 4 months"
    ExpiresByType application/vnd.ms-fontobject "access plus 1 month"
    # CSS and JavaScript
    ExpiresByType text/css                  "access plus 1 year"
    ExpiresByType application/javascript    "access plus 1 year"
</IfModule>
```

602

```
map $sent_http_content_type $localhost_expires {
    default +1M;
    text/cache-manifest 0;
    text/html 0;
    text/xml 0;
    application/xml 0;
    application/json 0;
    application/rss+xml +1h;
    application/atom+xml +1h;
    image/x-icon +1w;
    image/gif +4M;
    image/png +4M;
    image/jpeg +4M;
    image/webp +4M;
    video/ogg +4M;
    audio/ogg +4M;
    video/mp4 +4M;
    video/webm +4M;
    image/avif +4M;
    image/avif-sequence +4M;
    text/x-component +1M;
    font/ttf +4M;
    font/otf +4M;
    font/woff +4M;
    font/woff2 +4M;
    image/svg+xml +4M;
    application/vnd.ms-fontobject +1M;
    text/css +1y;
    application/javascript +1y;
}
expires $localhols_expires;
```

Fig. 6

SYSTEMS AND METHODS FOR AUTOMATED CONVERSION AND MANAGEMENT OF WEB SERVER CONFIGURATION FILES

FIELD OF TECHNOLOGY

The present disclosure relates to the field of web server configuration and management, specifically the automated translation of web server configuration files from one type of web server to another type of web server. For example, the management may be for converting web server configuration files which are Apache-based configuration files (.htaccess) to NGINX based configuration directives, and for facilitating a seamless transition for users from an Apache to NGINX web hosting on the CloudLinux platform.

BACKGROUND

Web hosting providers and users alike are constantly seeking improvements in efficiency, speed, and performance when delivering web content. The Hypertext Transfer Protocol (HTTP) Server of Apache, commonly referred to simply as "Apache", has been a widely adopted open-source HTTP server due to its robustness and flexibility. However, Apache has certain limitations including relatively high memory usage and lower performance under heavy load compared to other web servers such as NGINX. Similar to Apache, NGINX is also an open-source web server. The growth in popularity of NGINX is due to several reasons, including its asynchronous event driven approach to handle requests instead of using threads, thereby providing a predictable performance under high loads. In addition, NGINX performs reverse proxy, load balancing, HTTP cache services, etc.

An increasing number of web hosting providers and users are transitioning from Apache to NGINX due to its high performance and efficient resource utilization. However, these two types of web servers use different syntaxes and methods for server configuration. Apache utilizes .htaccess files to manage its configuration at the directory level. A transition from Apache to NGINX would then involve conversion of the Apache .htaccess files, which are used to dictate the configuration of the Apache server, to equivalent directives for the NGINX server. Since the Apache and NGINX web servers use different syntaxes and methods for server configuration, the conversion may be tedious, time-consuming, and prone to human errors. Furthermore, the conversion may lead to downtime if not executed properly, causing inconvenience to users and potential financial losses to businesses. One of the primary challenges is then efficiently converting these Apache .htaccess files into the equivalent directives for the NGINX server.

Specifically, in the context of CloudLinux, an operating system (OS) that offers a platform for Linux-based shared hosting services, these problems that occur during conversions become even more evident. A substantial number of CloudLinux users utilize Apache hosting and might be willing to switch to a more efficient NGINX hosting. However, the lack of an efficient, reliable, and seamless way of translating Apache configuration files into NGINX configuration directives poses a significant obstacle.

As mentioned above, Apache utilizes .htaccess files to manage its configuration at the directory level. With the increasing popularity of high-performance web servers like NGINX, there's a need for a system to seamlessly convert existing .htaccess configurations into a compatible format. The conversions often require manual intervention, technical expertise in both Apache and NGINX server configuration, and a significant investment of time. Moreover, these manual solutions are generally not designed to operate in real-time or near real-time, which means they are unable to provide a seamless user experience.

Therefore, there is a need for a tool that can automatically convert Apache .htaccess files to NGINX directives, particularly for users on the CloudLinux platform. In addition, there is a need for the conversion tool to operate in almost real time or in real time to minimize disruption, to reduce the chance of errors, and to improve the user experience during the transition from Apache to NGINX hosting. Therefore, there is a need for a method and a system for improving how Web server configuration files are converted and/or managed.

SUMMARY

Aspects of the disclosure relate to automated conversion and management of web server configuration files. The technologies presented herein provide an efficient and seamless solution to the aforementioned issues faced by users while transitioning from Apache to NGINX hosting. In one aspect, a specially designed converter application known as 'apache2nginx' is disclosed. The 'apache2nginx' application can be easily installed by users as a package, and can be integrated deeply with the user's Linux environment, similar to a cPanel system.

In one exemplary aspect, a method for automated conversion and management of web server configuration files using a converter application is disclosed, the method comprising: receiving an input configuration file for conversion from an Apache configuration file to an NGINX configuration file; parsing the received input configuration file into tokens for processing to construct an Apache configuration tree in memory; building a structured Apache configuration tree from the tokens and storing the structured Apache configuration tree in memory; traversing the Apache configuration tree examining each element of the Apache configuration tree, and for each Apache directive or block that is encountered during the examination, invoking a directive conversion plugin for handling requirements of the respective Apache directive or block; building an NGINX configuration tree corresponding to the Apache configuration tree; and writing the NGINX configuration depicted in the NGINX configuration tree to an NGINX configuration file that corresponds to the received input configuration file.

In one aspect, the method further comprises: launching the converter application in response to detection of at least one change in at least one Apache configuration file; reading Apache configuration files affected by the detected changes; and converting each affected Apache configuration file into a corresponding NGINX configuration file within the memory.

In one aspect, the method further comprises: writing the NGINX configuration file into memory when a conversion is completed; determining whether a reload of the NGINX service is required based on the changes made; and reloading the NGINX service when the reload is required, wherein the newest NGINX configuration files are applied after the completion of the reloading.

In one aspect, the traversing the Apache configuration tree examining each element of the Apache configuration tree comprises: recognizing Apache directives including at least RewriteCond, RewriteRule, and blocks with if modules for translating each of the recognized Apache directives to map blocks which allow mapping of values of a variable to values of another variable.

In one aspect, the method further comprises: configuring a monitoring service to monitor changes in configuration files present in a home directory of a user upon installation of the converter application; monitoring, by the monitoring service, for the changes in the configuration files, the changes comprising one or more of creations, deletions, and modifications of the files present in the home directory of the user; recording information regarding detected changes in a log file; polling the log file in accordance with a predetermined polling schedule to identify changes made to the monitored configuration files; and converting the configuration file to NGINX and updating the memory at least when the identified changes reach a predetermined threshold or a predetermined time interval for updating configuration files is reached.

In one aspect, the conversion of the Apache configuration file to the NGINX configuration file is performed while preserving logical structures present in the Apache configuration file.

In one aspect, the building of the NGINX configuration tree corresponding to the Apache configuration tree includes writing a proxy configuration for passing requests to the Apache when an element of the Apache configuration tree is not supported in an NGINX format.

According to one aspect of the disclosure, a system is provided for automated conversion and management of web server configuration files using a converter application, the system comprising at least one memory; and at least one hardware processor coupled with the at least one memory and configured, individually or in combination, to: receive an input configuration file for conversion from an Apache configuration file to an NGINX configuration file; parse the received input configuration file into tokens for processing to construct an Apache configuration tree in memory; build a structured Apache configuration tree from the tokens and store the structured Apache configuration tree in memory; traverse the Apache configuration tree examining each element of the Apache configuration tree, and for each Apache directive or block that is encountered during the examination, invoke a directive conversion plugin for handling requirements of the respective Apache directive or block; build an NGINX configuration tree corresponding to the Apache configuration tree; and write the NGINX configuration depicted in the NGINX configuration tree to an NGINX configuration file that corresponds to the received input configuration file.

In one exemplary aspect, a non-transitory computer-readable medium is provided storing a set of instructions thereon for automated conversion and management of web server configuration files using a converter application, wherein the set of instructions comprises instructions for: receiving an input configuration file for conversion from an Apache configuration file to an NGINX configuration file; parsing the received input configuration file into tokens for processing to construct an Apache configuration tree in memory; building a structured Apache configuration tree from the tokens and storing the structured Apache configuration tree in memory; traversing the Apache configuration tree examining each element of the Apache configuration tree, and for each Apache directive or block that is encountered during the examination, invoking a directive conversion plugin for handling requirements of the respective Apache directive or block; building an NGINX configuration tree corresponding to the Apache configuration tree; and writing the NGINX configuration depicted in the NGINX configuration tree to an NGINX configuration file that corresponds to the received input configuration file.

The method and system of the present disclosure are designed to improve automated conversion and management of web server configuration files. Upon execution of a single command, the 'apache2nginx' application initiates the transition from Apache to NGINX hosting. The 'apache2nginx' application performs an automatic translation of any .htaccess files present in the system into NGINX directives and configuration blocks. This translation process accounts for a broad syntax of common Apache configuration directives, facilitating a wide range of conversions.

Furthermore, the 'apache2nginx' application integrates tightly with web hosting control panel software. For example, the web hosting control panel software may be the cPanel software which provides Graphic User Interface (GUI) and automation tools designed to simplify the process of hosting web sites. The cPanel software may include hooks for facilitating integration of additional components. Thus, the 'apache2nginx' application of the present disclosure may be integrated with hooks of the cPanel system, thereby maintaining correct NGINX configuration for the current cPanel settings, such as the website's PHP (Hypertext Preprocessor) handler type. Notably, the 'apache2nginx' application of the present disclosure features an automatic fallback mechanism. In scenarios where unsupported directives or setup configurations are detected, the tool automatically sets up reverse proxying to Apache via NGINX. This automatic fallback mechanism ensures the continuity of web services and prevents potential downtime during the transition process.

In addition, by providing an almost real-time or real-time conversion of Apache .htaccess files to NGINX directives, the 'apache2nginx' application streamlines the transition process, reduces potential for errors, minimizes service disruptions, and enhances overall user experience.

The method of the present disclosure provides a solution to the problems described above by automatically converting .htaccess into NGINX configuration to interpret and translate .htaccess files into corresponding NGINX configurations.

Moreover, the system of the present disclosure provides near real-time and real-time detection and update of configuration changes. The updating of configuration changes may be performed: by actively monitoring for file creation, changes, or deletion utilizing tools like inotify, fanotify, ebpf, file-change-api from CloudLinux, etc.; and updating the configurations accordingly.

In addition, the system of the present disclosure handles "non-translatable" configurations intelligently. For example, when configurations are detected that cannot be translated, the system automatically sets up a proxy to Apache to handle those specific cases.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates an example of logical blocks of an .htaccess file generated by WP Rocket plugin software in accordance with aspects of the present disclosure.

FIG. 4 illustrates an example of NGINX configuration created by an "apache2nginx" application which corresponds to the example illustrated in FIG. 3 in accordance with aspects of the present disclosure.

FIG. 6 illustrates an exemplary comparison chart comparing an original Apache configuration for setting browser caching of specific resources versus an NGINX configuration generated by an apache2nginx application in accordance with aspects of the present disclosure.

DETAILED DESCRIPTION

Exemplary aspects are described herein in the context of a system, method, and a computer program for automated conversion and management of web server configuration files in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 7:
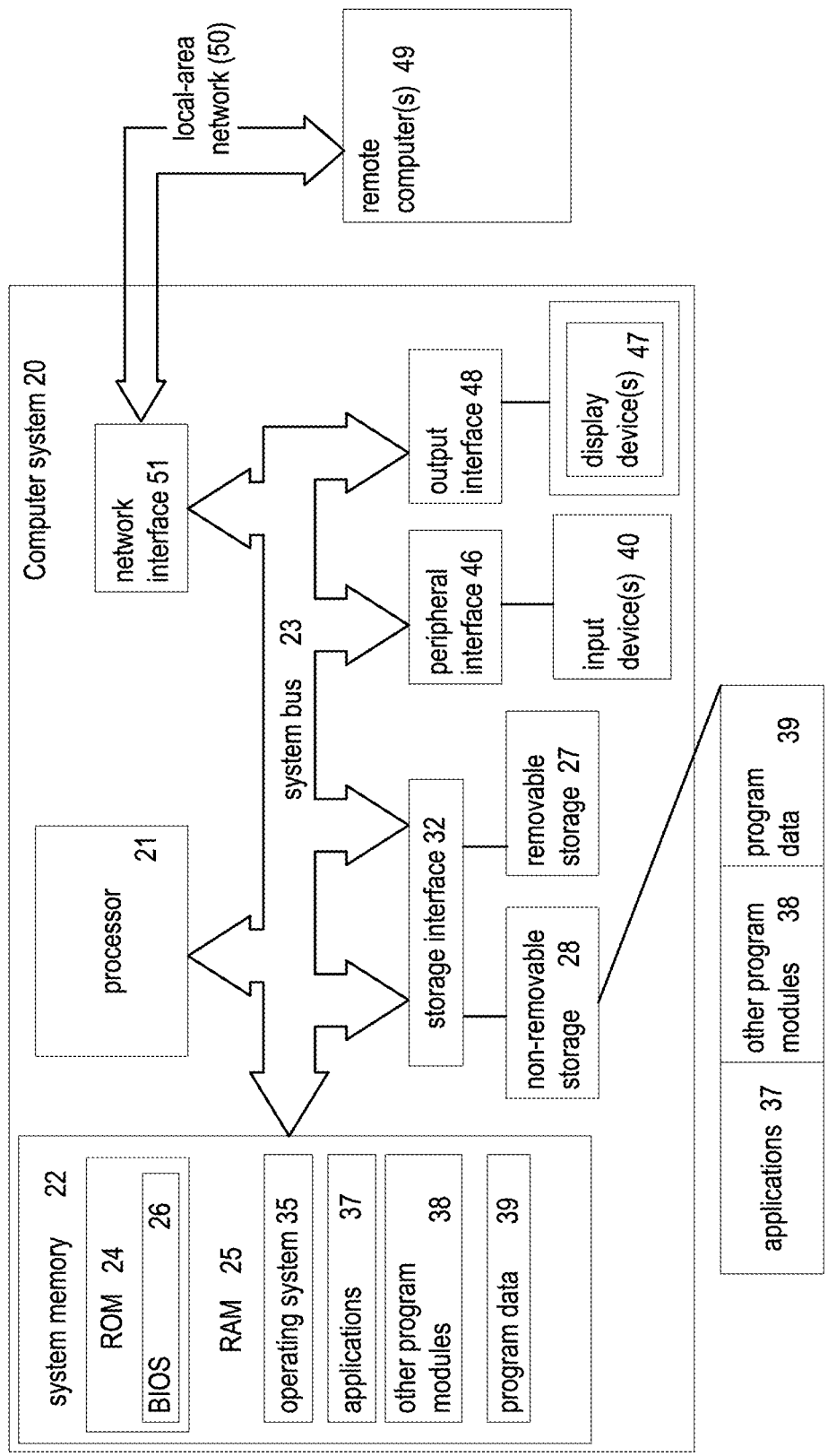
FIG. 7 presents an example of a general purpose computer system on which aspects of the present disclosure for automated conversion and management of web server configuration files can be implemented.

In some aspects of the present disclosure, some or all of the system for automated conversion and management of web server configuration files may be implemented on the processor of a general-purpose computer (which, for example, is depicted in FIG. 7). In this case, the components of the system may be realized within a single computing device, or distributed amongst several interconnected computing devices.

Figure 1:
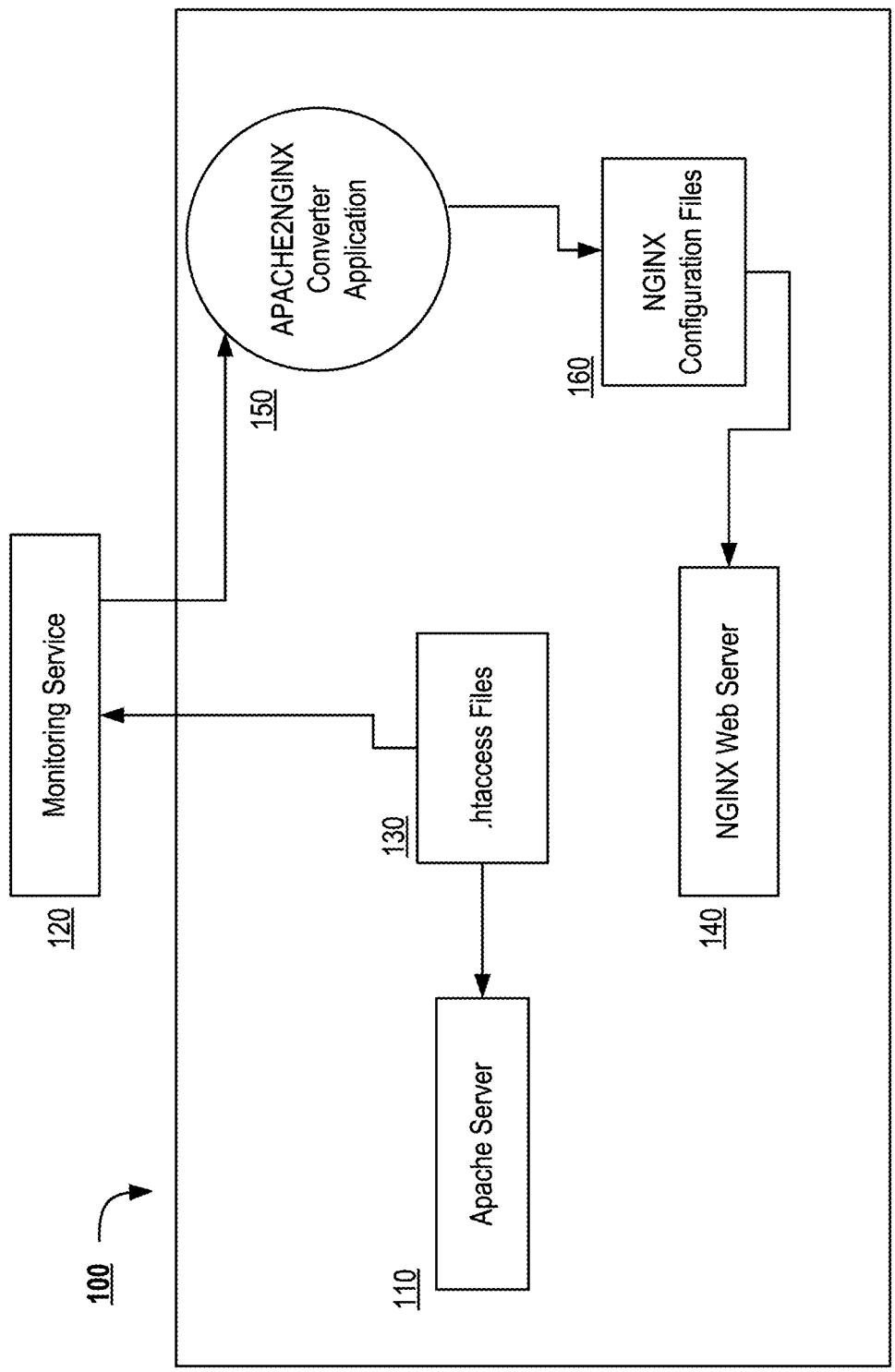
FIG. 1 illustrates a block diagram of an exemplary system for automated conversion and management of web server configuration files in accordance with aspects of the present disclosure.

FIG. 1 illustrates a block diagram of an exemplary system 100 for automated conversion and management of web server configuration files in accordance with aspects of the present disclosure.

In one aspect, a monitoring service 120 notifies the system 100 about changes to .htaccess files and the system 100 automatically converts the changes to the .htaccess files into a configuration format accepted by NGINX. The conversion to the format accepted by NGINX allows users to gain the benefits of NGINX's superior static files serving performance without needing to learn the NGINX's configuration format. The primary goal of system 100 includes at least enabling seamless integration of Apache's .htaccess files with the NGINX server through the use of a converter application, such as the "apache2nginx" converter application.

In one aspect, the system 100 comprises one or more components including at least an Apache server 110, .htaccess files 130, an NGINX server 140, a converter application 150 designed for converting from Apache to NGINX, and NGINX configuration files 160. The converter application 150 for converting from Apache to NGINX is a primary component of the present disclosure. Thus, in one aspect, the primary component of the present disclosure comprises the at least an "apache2nginx" converter application 150, which enables the NGINX web server 140 to support .htaccess files 130, by automatically converting the .htaccess files 130 to an NGINX configuration format—thereby converting each of the .htaccess files 130 files to a respective NGINX configuration file 160.

Returning to the monitoring service, in one aspect, upon the installation of the "apache2nginx" converter application 150, the Monitoring Service 120 is configured to monitor all .htaccess files present within user home directories. This means that the monitoring service 120 constantly observes changes, such as updates or deletions to .htaccess files. Information regarding these changes is then recorded to special log files by the monitoring service 120, creating an up-to-date record of all modifications. The monitoring service 120 is responsible for real-time configuration management. It uses inotify, fanotify, ebpf, file-change-api from CloudLinux, or other file monitoring technologies to watch .htaccess files.

The log files created by the monitoring service may then be polled using a job scheduler that runs periodically. For example, the job scheduler may be a cron service or other real-time or near-real-time mechanism that regularly polls the log files created by the monitoring service. The system then identifies changes made to the .htaccess files and updates the known locations of these files in the system accordingly. This regular polling ensures that the system always has an accurate understanding of the state of the .htaccess files. Such mechanism allows for automatic updates of NGINX configurations in nearly real-time or real-time when .htaccess files are created, modified, or deleted.

In one aspect, in response to the changes detected in the .htaccess files, the converter application 150 designed for converting from Apache to NGINX, i.e., "apache2nginx", is launched. The converter application 150 reads all affected .htaccess files 130, converting each of the .htaccess files 130 into an NGINX configuration format within its memory. The conversion process is efficient and includes handling the translation between the different syntaxes of Apache and NGINX. The converter application 150 utilizes a purpose-built interpreter that understands the syntax and semantics of Apache configurations to translate into NGINX configurations.

In one aspect, the apache2nginx application starts by interpreting the .htaccess files 130. The apache2nginx application recognizes the various Apache directives, such as RewriteCond and RewriteRule, and blocks, such as <IfModule>.

In one aspect, the apache2nginx application then translates the Apache directives into corresponding NGINX configuration using a series of NGINX configuration blocks and directives. Apache's RewriteCond statements are translated into NGINX "map" blocks, which allow for mapping a variable's value to another variable.

In one aspect, the apache2nginx application efficiently manages complex expressions, such as user-agent strings, by translating them into appropriate NGINX "map" blocks.

In addition, in one aspect, the apache2nginx application smartly handles a multitude of original Apache rewrite conditions by translating them into a series of interrelated maps, creating a complex logical structure that represents the original Apache logic.

In one aspect, the apache2nginx application implements intelligent configuration writing and reloading. In one aspect, the intelligent reloading is performed by checking whether target NGINX configuration has actually changed.

In one aspect, the apache2nginx application handes non-translatable configurations by detection and proxying, wherein:
- the detection comprises identifying configurations and setup scenarios that cannot be directly translated; and
- the proxying comprises dynamically creating reverse proxying an NGINX configuration to Apache for handling non-translatable configurations.

In one aspect, once the conversion is completed in memory, the "apache2nginx" converter application 150 writes the NGINX configuration files as needed. In one aspect, the writing of the NGINX configuration files is performed intelligently, by determining whether an actual reload of the NGINX service is required based on the nature of the changes made. If necessary, the converter application 150 proceeds to reloading the NGINX service, while ensuring that the new configurations are applied.

The conversion process described above is transparent to the end-users, who continue to work with th e familiar .htaccess files as they would on an Apache server. The users do not have to know the NGINX configuration format and do not need to learn the NGINX configuration format. Thus the users can benefit from the faster NGINX web hosting, especially when serving static files, without changing their existing workflows.

The exemplary system 100 illustrated in FIG. 1 in conjunction with the corresponding description provided above illustrate the intricacies of a seamless integration process that bridges two widely used web server technologies: Apache and NGINX. By leveraging the "apache2nginx" converter 150 and the associated monitoring service 120, and the utilization of the logging and conversion mechanisms, the present disclosure describes a compelling and improved way for users to transition from Apache to NGINX without losing access to the familiar and powerful .htaccess file controls. Whether through updates, deletions, or other modifications, the entire process from monitoring to conversion and reloading is handled efficiently, providing an elegant solution that combines performance with user convenience.

Figure 2:
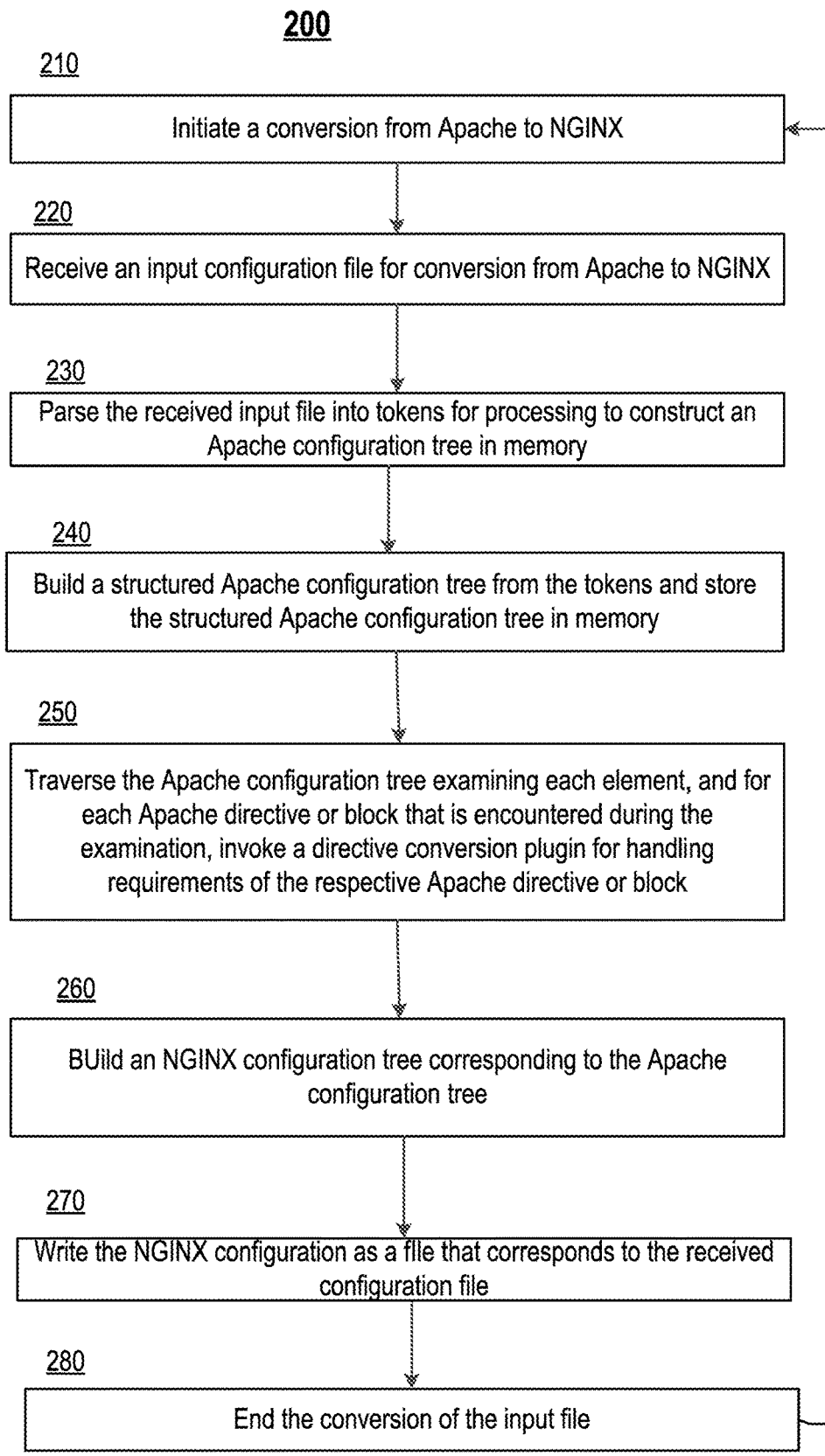
FIG. 2 illustrates a method for automated conversion and management of web server configuration files in accordance with aspects of the present disclosure.

FIG. 2 illustrates a method 200 for automated conversion and management of web server configuration files in accordance with aspects of the present disclosure.

In one aspect, the method 200 is implemented to convert Apache's .htaccess files into NGINX's configuration files. First, the apache2nginx program intelligently scans existing Apache configuration into tokens (e.g., lexems), and builds an Apache configuration tree. Then, the method traverses the tree and analyzes the Apache directives, invokes "directive conversion plugins" while accounting for current conversion context. In one aspect, the process of method 200 creates NGINX configuration tree which may be further written to a flat file. In another aspect, the configuration tree may be written as per layout defined by conventions of NGINX distribution that is primary for the system. In one aspect, method 200 performs seamless conversion between Apache's .htaccess files and NGINX's configuration format, thereby enabling the integration of NGINX's high-performance web hosting with the familiar .htaccess file controls.

In step 210, method 200 initiates a conversion of configuration files from Apache to NGINX. In one aspect, the initiation of the conversion comprises enabling the converter application 150 to be ready to accept input in a form of at least one of: individual .htaccess files, or a special file referred to as a "context" file. In one aspect, the context file is used by the converter application 150 on cPanel and other panel servers to hold information about the location of .htaccess files, website information, such as whether Hypertext Pre-processor—Fast Process Manager (PHP-FPM) is enabled, etc.

In step 220, method 200 receives an input configuration file for conversion from Apache to NGINX. For example, the method may receive an .htaccess file as an input. In one aspect, the received input file comprises at least one of: an .htaccess file, and a context file containing necessary information for performing the conversion.

In step 230, method 200 parses the received input configuration file into tokens (or lexemes) for processing. In one aspect, the parsing comprises tokenization of the input file—thereby breaking down configurations of the file into smaller pieces. In one aspect, each piece of the smaller pieces is easily manageable and processable for construction of an Apache configuration tree in memory.

In step 240, method 200 builds a structured Apache configuration tree from the tokens and stores the structured Apache configuration tree in memory.

In one aspect, the building of the structured Apache configuration tree further includes: determining which Apache configuration modules are enabled on the system, and discarding optional blocks for configuration modules that are not enabled. For example, the converter application 150 may check which Apache modules are enabled on the system and discard blocks designated with "<IfModule>" for modules that are not enabled.

In step 250, method 200 traverses the Apache configuration tree examining each element of the Apache configuration tree, and for each Apache directive or block that is encountered during the examination, invokes a directive conversion plugin for handling requirements of the respective Apache directive or block. In one aspect, the converter invokes its own specialized directive conversion plugin for each type of Apache directive. For each of the different Apache directives, the respective plugin handles the specific requirements of the Apache directive, ensuring that the translation to the format of NGINX is accurate.

In step 260, method 200 builds NGINX configuration tree corresponding to the Apache configuration tree.

In one aspect, the building of the NGINX configuration tree corresponding to the Apache configuration tree includes writing a proxy configuration for passing requests to Apache when a conversion of an element of the Apache configuration tree is not possible. For example, in some rare cases, where the conversion is not straightforward due to the extensive feature set of Apache, a "proxy pass" configuration may be written to serve requests via Apache.

In step 270, method 200 writes the NGINX configuration as a file corresponding to the received input configuration file. Thus, the converted NGINX configuration (either fully converted or just the "proxy pass to Apache" configuration) is written to the system. The proxy pass configuration is written when either Apache configuration was not understood by the converter or in cases when the website backend is not supported, since NGINX only works with PHP-FPM backend. The proxy configuration ensures that Apache can continue to handle .htaccess directives as usual, for websites which have non-translatable Apache configuration and/or unsupported setup configurations.

In step 280, method 200 ends the conversion of the input file received in step 220 and/or returns to step 220 to receive more input files. Thus, method 200 concludes with the completion of the conversion of the input file received in step 220. The converter application 150 of the present disclosure writes an NGINX configuration that allows for seamless usage of NGINX, even in rare cases where a feature set supported on Apache but not NGINX is required. Hence, method 200 provides a flexible solution that accommodates various web hosting scenarios.

In one aspect, the method further comprises: launching the converter application in response to detection of at least one change in at least one Apache configuration file; reading Apache configuration files affected by the detected changes; and converting each affected Apache configuration file into a corresponding NGINX configuration file within the memory.

In one aspect, the method further comprises: writing the NGINX configuration file into memory when a conversion is completed; determining whether a reload of the NGINX service is required based on the changes made; and reloading the NGINX service when the reload is required, wherein the newest NGINX configuration files are applied after the completion of the reloading.

In one aspect, the traversing the Apache configuration tree examining each element of the Apache configuration tree comprises: recognizing Apache directives including at least RewriteCond, RewriteRule, and blocks with if modules for translating each of the recognized Apache directives to map blocks which allow mapping of values of a variable to values of another variable.

In one aspect, the method further comprises: configuring a monitoring service to monitor changes in configuration files present in a home directory of a user upon installation of the converter application; monitoring, by the monitoring service, for the changes in the configuration files, the changes comprising one or more of creations, deletions, and modifications of the files present in the home directory of the user; recording information regarding detected changes in a log file; polling the log file in accordance with a predetermined polling schedule to identify changes made to the monitored configuration files; and converting the configuration file to NGINX and updating the memory at least when the identified changes reach a predetermined threshold or a predetermined time interval for updating configuration files is reached.

In one aspect, the conversion of the Apache configuration file to the NGINX configuration file is performed while preserving logical structures present in the Apache configuration file.

In one aspect, the building of the NGINX configuration tree corresponding to the Apache configuration tree includes writing a proxy configuration for passing requests to the Apache when an element of the Apache configuration tree is not supported in an NGINX format.

Thus, as described above, FIG. 2 presents a methodical process for converting Apache's .htaccess files into NGINX's configuration format. From receiving the .htaccess input to tokenization, tree-building, and writing the final NGINX configuration files, the flow of method 200 is structured to handle complex conversion scenarios. One of the benefits of the method of the present disclosure is the usage of the "proxy pass" configuration to allow Apache to handle requests when required. This process ensures that customers can utilize the robust web hosting capabilities of NGINX while maintaining the flexibility of the .htaccess controls of the Apache—thereby providing a unified solution that enhances both performance and convenience.

FIG. 3 illustrates an example 300 of logical blocks of an .htaccess file generated by WordPress (WP) Rocket plugin software in accordance with aspects of the present disclosure. The example illustrated in FIG. 3 contains multiple rewrite rule blocks that are found within a single .htaccess file. The rewrite rules are given in four different segments, with the different segments having respective conditions and configurations. The four different segments represent the following functionalities: a segment for SSL handling, a segment for word press routing, a segment for GZIP encoding, and a segment for user-agent handling and caching.

In one aspect, the segment for SSL handling deals with conditions relating to HTTPS, and when any condition is met, an environment variable WPR_SSL is set to https. An example of a rewrite rule for the segment for SSL Handling is shown in 301.

In one aspect, the segment for word press routing relates to the standard routing for a WordPress site. This segment incorporates several conditions and rewrite rules that manage the request for files, directories, and WordPress's index.php. An example of a rewrite rule for word press routing is shown in 302.

In one aspect, the segment for GZIP Encoding handles a conditional statement to check if the browser accepts GZIP encoding, and when the browser accepts the GZIP encoding the segments sets the WPR_ENC environment variable to GZIP. An example of a rewrite rule for GZIP encoding is shown in 303.

In one aspect, the segment for user-agent handling and caching includes a wide range of conditions that inspect the user-agent, query string, cookies, and more to redirect to a cached HTML file if conditions are met. This segment is particularly complex and includes functionalities for handling mobile devices, robots, and particular applications like Facebook and WhatsApp. An example of a rewrite rule for user-agent handling and caching is shown in 304.

The complexity and depth of these rules indeed pose a challenge for conversion to the NGINX format, especially considering that they have to be processed in conjunction with the current system environment and the Apache modules that are active.

FIG. 4 illustrates an example 400 of NGINX configuration 401 created by an "apache2nginx" application which corresponds to the example illustrated in FIG. 3 in accordance with aspects of the present disclosure. Thus, FIG. 4 illustrates how the Apache rewrite rules illustrated in FIG. 3 are translated into NGINX configuration using the "apache2nginx" converter. This conversion from Apache to NGINX involves: mapping variables and concatenation of the mapped variables.

In one aspect, the mapping of variables comprises employing a series of map directives to translate Apache's conditions and rules into NGINX compatible variables and value checks. Thus, this method allows for a clear, structured conversion of various conditions from several rewrite rules, preserving the logic and functionality.

In one aspect, the concatenation of the mapped variables comprises: in the last map directive, using the concatenated values from the previously defined maps to set a variable, $localhost_try_files_uri, which represents a destination file for serving a request. The "try_files" directive leverages the $localhost_try_files_uri variable to attempt to serve the cache file at the computed URI. If the attempt to serve is unsuccessful, the method falls back to other specified options. If WordPress caching plugin has not generated a cache file for the resource requested the method ultimately relies on the standard WordPress index.php file.

In summary, FIG. 3 and FIG. 4 provide a comprehensive example of the conversion process from Apache to NGINX. FIG. 3 illustrates the complexity and variety of rewrite rules typically found in an Apache .htaccess file, including SSL handling, WordPress routing, encoding checks, and user-agent handling. The example of FIG. 4 demonstrates the method employed by the "apache2nginx" converter to take the complex Apache rules of FIG. 3 and translates them into efficient NGINX configurations. This intricate conversion from Apache to NGINX is achieved by using map blocks to reproduce the conditions and actions specified in Apache's rewrite rules, and culminating in a try_files directive to process the request.

The conversion process illustrated in FIG. 3 and FIG. 4 exemplifies the challenges and innovative solutions involved in converting configurations between these two popular web servers, to facilitate seamless operation for the users. Moreover, the example illustrates the necessity for fallback mechanisms and special handling for various scenarios, such as where even more complex Apache configurations which can't be represented in NGINX configuration format are identified.

Figure 5:
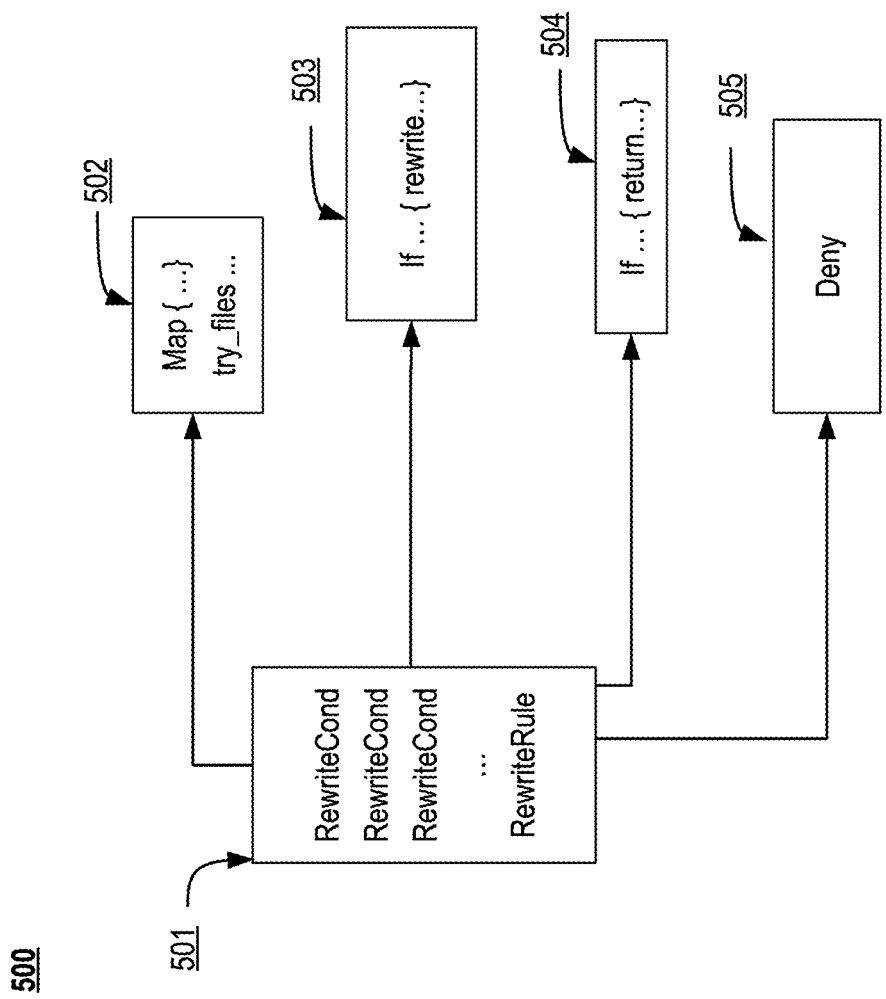
FIG. 5 illustrates examples of various conversions for an Apache rewrite module's primary directive in accordance with aspects of the present disclosure.

FIG. 5 illustrates examples 500 of various conversions for an Apache rewrite module's primary directive in accordance with aspects of the present disclosure. In one aspect, the Apache2nginx converter 150 is capable of choosing an optimal NGINX configuration construct depending on original Apache directives argument 501. The reasons for the necessity of the variations will be described below. For example, FIG. 5 illustrates the various ways that "RewriteCond" and "RewriteRule" directives from Apache can be converted to different structures in NGINX using one of: a map { } with try_files, as shown in 502; an if block with rewrite inside, as shown in 503; an if block with return inside, as shown in 504; or a deny, as shown in 505. In one aspect, when using map { } with try_files, as shown in 502, the map directive creates a variable whose value depends on another variable. When paired with try_files, this method is powerful in dealing with complex conditions that need to map to specific files or URIs. It is a neat and performance friendly way to replicate the functionality of multiple rewrite conditions and rules which check files for existence before attempting to use them for serving requests.

In one aspect, when using an if block with rewrite inside, as shown in 503, the conditions and rewrite rules from Apache may be more straightforward and may be directly translated to an if block containing a rewrite directive in NGINX. This approach is used when there are specific conditions that, if met, require a rewrite of the request URI.

In one aspect, in cases where the Apache rules are meant to redirect the request to a new location or provide a specific HTTP status code, using an if block with a return directive inside, as shown in 504, may be the most straightforward conversion. This approach allows for conditional responses based on the incoming request.

In one aspect, when using deny, as shown in 505, Apache's RewriteRule may perform straightforward access control, such as denying access to certain locations or from specific IPs. In such cases, the deny directive in NGINX may be used directly. This approach provides a clear and efficient way to replicate the access control functionality.

Apache's rewrite rule module directives are the most complex and challenging part in the apache2nginx converter implementation. This complexity arises from the richness and flexibility of Apache's mod_rewrite module, which can result in many variants (1:n) of possible conversions. The apache2nginx converter 150 translates these to the most optimal and performance-friendly variants in NGINX. However, due to the differences in syntax and functionality between Apache and NGINX, some Apache configurations might not have a direct equivalent in NGINX.

In one aspect, when an Apache configuration does not have an equivalent configuration in NGINX, a proxy pass configuration is used to fallback to Apache. Thus, in rare and complex cases where a direct conversion is not feasible, the converter might resort to using a proxy-pass snippet to proxy the request back to an Apache instance. This ensures that the functionality is preserved even when a direct NGINX equivalent does noy exist.

For example, on a cPanel server, the proxy-pass configuration written by apache2nginx may be as follows:

```
location /{
include conf.d/includes-optional/cpanel-proxy.conf;
proxy_pass
http://$CPANEL_APACHE_PROXY_IP:$CPANEL_A-
    PACHE_PROXY_PORT;
}.
```

In conclusion, the description of FIG. 5 highlights the multifaceted nature of converting Apache rewrite rules to NGINX. The intricacy of the apache2nginx converter in handling a variety of scenarios and choosing the most optimal and performant NGINX structures is illustrated in conjunction with the description of FIG. 5.

As described above, the complexity of Apache's mod_rewrite module and the diversity in its usage make this conversion a challenging task. However, the converter's adaptability in selecting the best method or even falling back to proxying to Apache, in rare cases, demonstrates the robustness and sophistication of the tool of the present disclosure in ensuring that the web server's functionality remains consistent and efficient across both platforms.

FIG. 6 illustrates an exemplary comparison chart 600 comparing an original Apache configuration 601 for setting browser caching of specific resources versus an NGINX configuration 602 generated by an apache2nginx application. For example, the comparison chart 600 of a sample Apache .htaccess configuration may define setting browser caching for specific resource types defined by their respective MIME and expiration time in browser cache, and a corresponding NGINX configuration generated by the apache2nginx system of the present disclosure. The apache2nginx system exemplifies an improved solution to a complex problem in that it translates between two substantially different web server configuration languages, and performs the translation in a way that maintains the underlying logic and function.

This translation demonstrates the system's robust capability to handle intricate rules, various conditions, and even the most complex regular expressions. By efficiently converting Apache rules into NGINX's more performance-oriented configuration, the apache2nginx system greatly facilitates the transition between these popular web servers. In one aspect, the translation process of the present disclosure requires analysis of configuration syntaxes and semantics of the Apache and NGINX.

FIG. 7 is a block diagram illustrating a computer system 20 on which aspects of systems and methods for automated conversion and management of web server configuration files may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automated conversion and management of web server configuration files using a converter application, the method comprising:
    receiving an input configuration file for conversion from an Apache configuration file to an NGINX configuration file;
    parsing the received input configuration file into tokens for processing to construct an Apache configuration tree in memory;
    building a structured Apache configuration tree from the tokens and storing the structured Apache configuration tree in memory;
    traversing the Apache configuration tree examining each element of the Apache configuration tree, and for each Apache directive or block that is encountered during the examination, invoking a directive conversion plugin for handling requirements of the respective Apache directive or block;
    building an NGINX configuration tree corresponding to the Apache configuration tree; and
    writing the NGINX configuration depicted in the NGINX configuration tree to an NGINX configuration file that corresponds to the received input configuration file.

2. The method of claim 1, further comprising:
    launching the converter application in response to detection of at least one change in at least one Apache configuration file;
    reading Apache configuration files affected by the detected changes; and
    converting each affected Apache configuration file into a corresponding NGINX configuration file within the memory.

3. The method of claim 2, further comprising:
    writing the NGINX configuration file into memory when a conversion is completed;
    determining whether a reload of the NGINX service is required based on the changes made; and
    reloading the NGINX service when the reload is required, wherein the newest NGINX configuration files are applied after the completion of the reloading.

4. The method of claim 1, wherein the traversing the Apache configuration tree examining each element of the Apache configuration tree comprises:
    recognizing Apache directives including at least RewriteCond, RewriteRule, and blocks with if modules for translating each of the recognized Apache directives to map blocks which allow mapping of values of a variable to values of another variable.

5. The method of claim 1, further comprising:
    configuring a monitoring service to monitor changes in configuration files present in a home directory of a user upon installation of the converter application;
    monitoring, by the monitoring service, for the changes in the configuration files, the changes comprising one or more of creations, deletions, and modifications of the files present in the home directory of the user;
    recording information regarding detected changes in a log file;
    polling the log file in accordance with a pre-determined polling schedule to identify changes made to the monitored configuration files; and
    converting the configuration file to NGINX and updating the memory at least when the identified changes reach a predetermined threshold or a predetermined time interval for updating configuration files is reached.

6. The method of claim 1, wherein the conversion of the Apache configuration file to the NGINX configuration file is performed while preserving logical structures present in the Apache configuration file.

7. The method of claim 1, wherein the building of the NGINX configuration tree corresponding to the Apache configuration tree includes writing a proxy configuration for passing requests to the Apache when an element of the Apache configuration tree is not supported in an NGINX format.

8. A system for automated conversion and management of web server configuration files using a converter application, comprising:
- at least one memory; and
- at least one hardware processor coupled with the at least one memory and configured, individually or in combination, to:
  - receive an input configuration file for conversion from an Apache configuration file to an NGINX configuration file;
  - parse the received input configuration file into tokens for processing to construct an Apache configuration tree in memory;
  - build a structured Apache configuration tree from the tokens and storing the structured Apache configuration tree in memory;
  - traverse the Apache configuration tree examining each element of the Apache configuration tree, and for each Apache directive or block that is encountered during the examination, invoke a directive conversion plugin for handling requirements of the respective Apache directive or block;
  - build an NGINX configuration tree corresponding to the Apache configuration tree; and
  - write the NGINX configuration depicted in the NGINX configuration tree to an NGINX configuration file that corresponds to the received input configuration file.

9. The system of claim 8, the at least one hardware processor coupled with the at least one memory further configured to:
- launch the converter application in response to detection of at least one change in at least one Apache configuration file;
- read Apache configuration files affected by the detected changes; and
- convert each affected Apache configuration file into a corresponding NGINX configuration file within the memory.

10. The system of claim 9, the at least one hardware processor coupled with the at least one memory further configured to:
- write the NGINX configuration file into memory when a conversion is completed;
- determine whether a reload of the NGINX service is required based on the changes made; and
- reload the NGINX service when the reload is required, wherein the newest NGINX configuration files are applied after the completion of the reloading.

11. The system of claim 8, wherein the traversing the Apache configuration tree examining each element of the Apache configuration tree comprises:
- recognizing Apache directives including at least RewriteCond, RewriteRule, and blocks with if modules for translating each of the recognized Apache directives to map blocks which allow mapping of values of a variable to values of another variable.

12. The system of claim 8, the at least one hardware processor coupled with the at least one memory further configured to:
- configure a monitoring service to monitor changes in configuration files present in a home directory of a user upon installation of the converter application;
- monitor, by the monitoring service, for the changes in the configuration files, the changes comprising one or more of creations, deletions, and modifications of the files present in the home directory of the user;
- record information regarding detected changes in a log file;
- poll the log file in accordance with a pre-determined polling schedule to identify changes made to the monitored configuration files; and
- convert the configuration file to NGINX and updating the memory at least when the identified changes reach a predetermined threshold or a predetermined time interval for updating configuration files is reached.

13. The system of claim 8, wherein the conversion of the Apache configuration file to the NGINX configuration file is performed while preserving logical structures present in the Apache configuration file.

14. The system of claim 8, wherein the building of the NGINX configuration tree corresponding to the Apache configuration tree includes writing a proxy configuration for passing requests to the Apache when an element of the Apache configuration tree is not supported in an NGINX format.

15. A non-transitory computer readable medium storing thereon computer executable instructions for automated conversion and management of web server configuration files using a converter application, including instructions for:
- receiving an input configuration file for conversion from an Apache configuration file to an NGINX configuration file;
- parsing the received input configuration file into tokens for processing to construct an Apache configuration tree in memory;
- building a structured Apache configuration tree from the tokens and storing the structured Apache configuration tree in memory;
- traversing the Apache configuration tree examining each element of the Apache configuration tree, and for each Apache directive or block that is encountered during the examination, invoking a directive conversion plugin for handling requirements of the respective Apache directive or block;
- building an NGINX configuration tree corresponding to the Apache configuration tree; and
- writing the NGINX configuration depicted in the NGINX configuration tree to an NGINX configuration file that corresponds to the received input configuration file.

16. The non-transitory computer readable medium of claim 15, the instruction further comprising instructions for:
- launching the converter application in response to detection of at least one change in at least one Apache configuration file;
- reading Apache configuration files affected by the detected changes; and
- converting each affected Apache configuration file into a corresponding NGINX configuration file within the memory.

17. The non-transitory computer readable medium of claim 16, the instruction further comprising instructions for:

writing the NGINX configuration file into memory when a conversion is completed;

determining whether a reload of the NGINX service is required based on the changes made; and reloading the NGINX service when the reload is required, wherein the newest NGINX configuration files are applied after the completion of the reloading.

18. The non-transitory computer readable medium of claim 16, the instruction further comprising instructions for:

configuring a monitoring service to monitor changes in configuration files present in a home directory of a user upon installation of the converter application;

monitoring, by the monitoring service, for the changes in the configuration files, the changes comprising one or more of creations, deletions, and modifications of the files present in the home directory of the user;

recording information regarding detected changes in a log file;

polling the log file in accordance with a pre-determined polling schedule to identify changes made to the monitored configuration files; and converting the configuration file to NGINX and updating the memory at least when the identified changes reach a predetermined threshold or a predetermined time interval for updating configuration files is reached.

19. The non-transitory computer readable medium of claim 15, wherein the traversing the Apache configuration tree examining each element of the Apache configuration tree comprises:

recognizing Apache directives including at least RewriteCond, RewriteRule, and blocks with if modules for translating each of the recognized Apache directives to map blocks which allow mapping of values of a variable to values of another variable.

20. The non-transitory computer readable medium of claim 15, wherein the conversion of the Apache configuration file to the NGINX configuration file is performed while preserving logical structures present in the Apache configuration file.

21. The non-transitory computer readable medium of claim 15, wherein the building of the NGINX configuration tree corresponding to the Apache configuration tree includes writing a proxy configuration for passing requests to the Apache when an element of the Apache configuration tree is not supported in an NGINX format.

* * * * *